United States Patent Office 3,452,007
Patented June 24, 1969

3,452,007
3-KETAL, 3-ENOL ETHER AND 3-PYRROLIDINE DERIVATIVES OF 17α-ETHYNYL AND 17α-HALO ETHYNYL - 17β - TETRAHYDROPYRANYLOXY-ESTRA-5(10),9(11)-DIEN-3-ONES
Lewis H. Sarett, Princeton, and Thomas S. Bry, Linden, N.J., John Fried, Palo Alto, Calif., Arthur E. Oberster, North Canton, Ohio, and Roger E. Beyler, Carbondale, Ill., assignors to Merck & Co., Inc., Rahway, N.J., a corporation of New Jersey
No Drawing. Filed Aug. 13, 1965, Ser. No. 497,576
Int. Cl. C07c *173/00, 167/30, 169/10*
U.S. Cl. 260—239.55
16 Claims

ABSTRACT OF THE DISCLOSURE 3-ketal, 3-enol ether and 3-pyrrolidine derivatives of 17α-ethynyl and 17α-haloethynyl-17β-tetrahydropyranyloxy-estra-5(10),9(11)-dien-3-ones are prepared from the corresponding 3-ketal, 3-enol ether and 3-pyrrolidine-17α-ethynyl steroids by reaction with tetrahydropyran and, if desired, a halogenating agent.

---

This invention relates to steroid compounds and to processes for preparing them. More particularly, it relates to processes for enhancing the progestational acvtivity of 17α-ethynyl steroids of the estrane series by substituting the hydrogen atom at the β-position of the ethynyl group with a halogen atom. It relates also to novel intermediates and to processes by which they are prepared.

Compounds prepared using the novel processes of this invention may be represented by the formula:

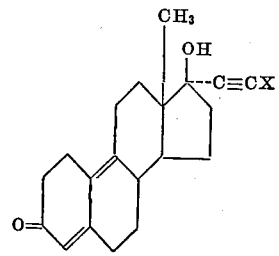

wherein X is chlorine or bromine.

In accordance with this invention, the progestational activity of 17α-ethynyl-17β-hydroxy-estra-4,9(10)-dien-3-one is enhanced by replacing the hydrogen of the ethynyl group with a halogen atom such as chlorine or bromine. The ethynyl compound may be obtained by reacting the corresponding estradiene-3,17-dione with a metal acetylide in liquid ammonia, for example an alkali metal or alkaline earth metal acetylide, suitably sodium, potassium or calcium acetylide.

In one method of replacing the hydrogen atom of the 17α-ethynyl group with a halogen atom, the starting compound, i.e. 17α-ethynyl-17β-hydroxy-estra-4,9(10)-dien-3-one is first protected at the C–3 position with a readily removable group, for example by conversion of the compound to a ketal, enol ether or pyrrolidine derivative by reaction with the appropriate derivatizing agent. The derivative is next converted to a 17β-ether, for example a tetrahydropyranyl ether. The resulting compound is then converted to an ethynyl anion which is reacted with positive halogen. The sequence of reactions may be illustrated as follows:

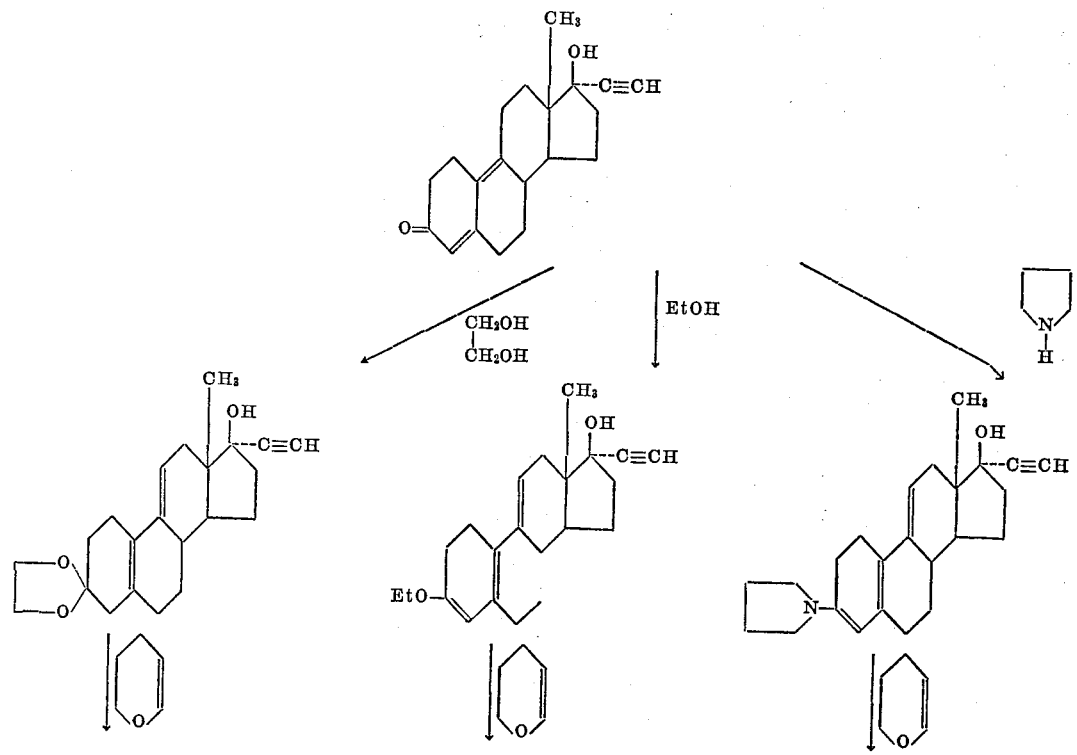

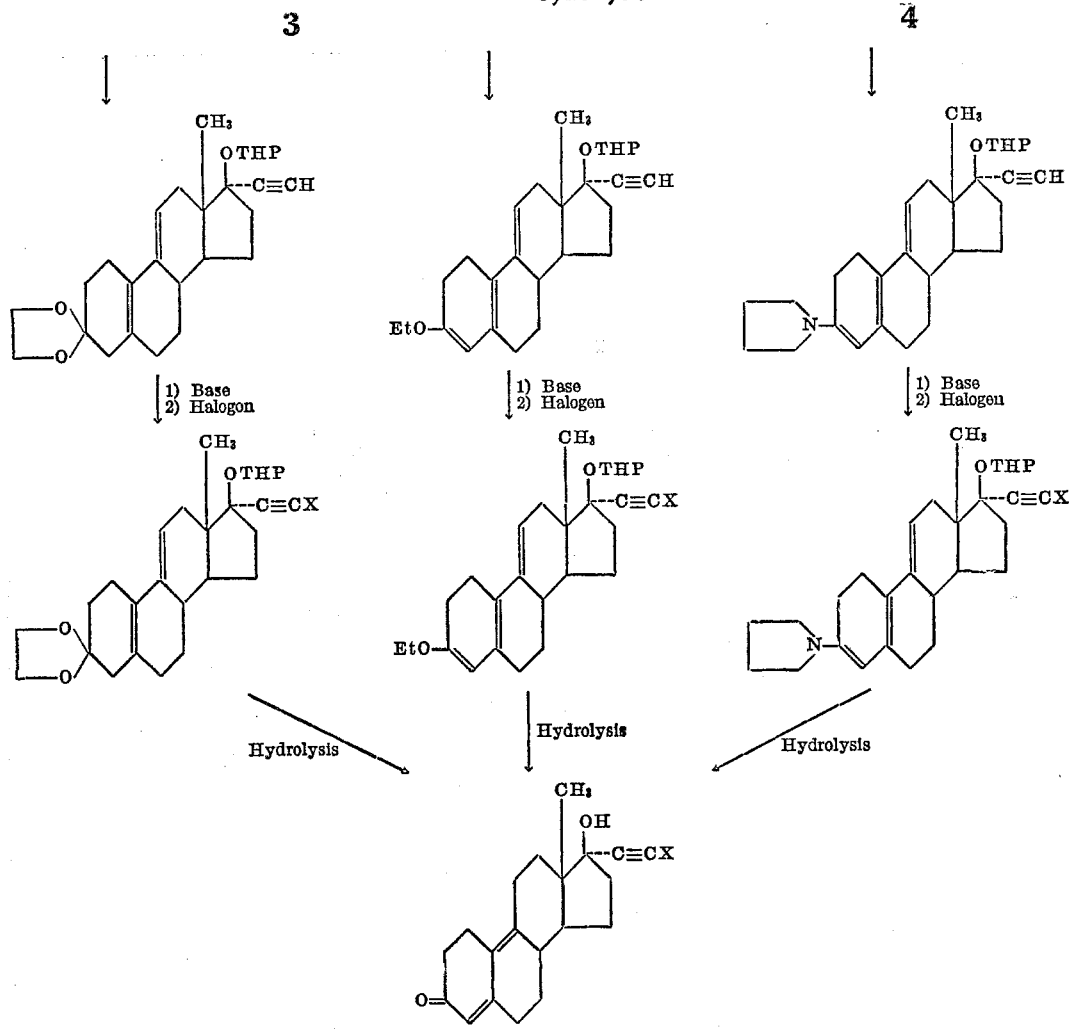

In the foregoing sequence X has the same meaning as above.

The 3-alkyleneoxy compounds are readily prepared by reaction with lower alkylene diols. The ethylenedioxy derivative is prepared by reacting the steroid with excess ethylene glycol in a reaction inert lower hydrocarbon or halogenated hydrocarbon solvent such as benzene, toluene or ethylene dichloride in the presence of acid catalysts. Organic acids or inorganic acids such as p-toluene sulfonic acid or sulfuric acid may be employed. The water by-product of the reaction is continuously removed.

In an alternative method a dioxolane such as 2-ethyl-2-methyl-1,3-dioxolane is used in place of ethylene glycol. Under similar reaction conditions the by-product, the ketone formed by the decomposition of the dioxolane, for example, butanone, is similarly continuously removed.

Other ketals, such as lower alkylenedioxy ketals containing up to seven carbon atoms are similarly prepared.

Enol ether derivatives may be prepared by the addition of alkyl orthoformates such as ethyl orthoformate and an acid catalyst such as p-toluene sulfonic acid to a solution of the steroid in a reaction inert solvent such as dioxane and agitating for from about 1 to about 3 hours at a temperature of from about 20° C. to about 35° C.

N-pyrrolidine derivatives are prepared by heating a mixture of the steroid and pyrrolidine, preferably a slight excess, in a lower alkanol solvent containing up to five carbon atoms. It is convenient to reflux the mixture in an alkanol such as methanol for from about 1 to 3 hours.

The 17β-position is protected by conversion to an ether, suitably a tetrahydropyranyl ether. This may be effected by mixing the steroid and dihydropyran either in a reaction inert solvent or excess dihydropyran and allowing the mixture to stand at from about 20° C. to about 35° C. for from about 10 to about 20 hours in the presence of an catalyst. Suitable catalysts include p-toluene sulfonyl chloride and 2,4-dinitrobenzene sulfonyl chloride.

In one modification of the base-halogen sequence illustrated above, the steroid, i.e. the steroid protected at the 3-position and at the 17-position is converted to an alkali metal salt suitably a sodium or potassium salt and this is reacted with a N-haloacylimide such as N-bromo- or N-chlorosuccinimide. The salt may be prepared by adding metallic alkali metal to liquid ammonia containing a trace of a feric salt such as ferric chloride and thereafter adding a solution of the steroid in a reaction inert solvent such as tetrahydrofuran. Reaction is completed by, for example, stirring for from about 1 to about 3 hours. The ammonia is then allowed to evaporate and a solution of the selected N-haloacylimide in a reaction inert solvent added. The mixture is allowed to stand, preferably with stirring for from about 12 to about 18 hours to complete reaction.

The product may be isolated in any convenient manner. In one procedure, the reaction mixture is poured into cold water and extracted with ether. The organic layer is washed with aqueous base, then with water and dried over an anhydrous drying agent such as anhydrous magnesium sulfate. The drying agent is removed and the solvent evaporated to leave the desired product as a residue. It may be purified chromatographically.

As an alternative to actual preparation of an alkali metal salt, the steroid and a suspension of an alkali metal amide such as sodamide in a reaction inert organic solvent such as a hydrocarbon solvent, suitably benzene or toluene and a slight excess of sulfonyl halide may be heated preferably under nitrogen at from about 80° C. to about 100° C. for from about 1 to about 4 hours. A preferred sulfonyl halide is p-toluene sulfonyl chloride.

The product may be isolated from the organic solvent in the same manner utilized to isolate the same product as described in the previous paragraph.

Both of these reactions may be generically described as reactions of the steroid with a source of positive halogen in the presence of a strong base.

An alternative procedure is available for the substitution of the hydrogen atom of the ethylnyl group with a halogen without the necessity of protecting the 3-oxo group. It is, however, advisable to protect the 17β-hydroxyl group by conversion to an ether such as the tetrahydropyranyl ether. In this process, the same starting compound used above is first converted to an ether and then to a 20,21-dihalo compound which is dehydrohalogenated to give the desired compound as an ether derivative.

The reaction sequence is illustrated as follows:

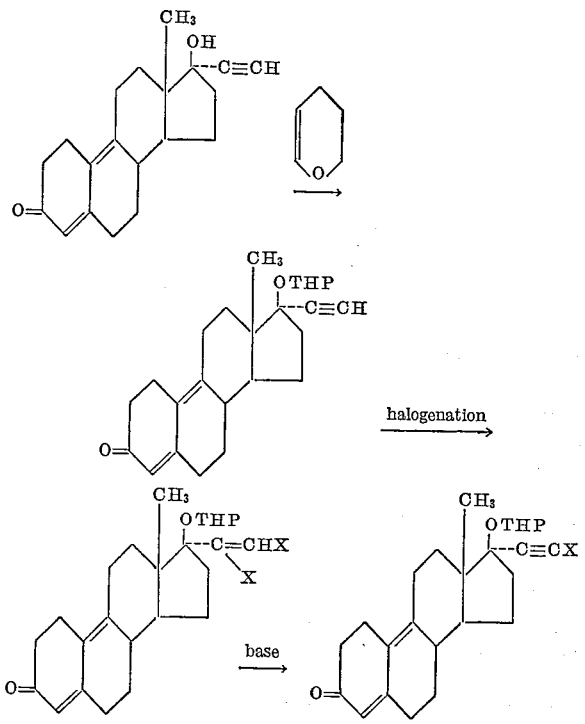

The 17β-tetrahydropyranyloxy derivative is formed in the same manner as described above. It is then converted to a dihalo steroid. The dihalo steroid thus formed is most conveniently named as a derivative of pregnane, and this nomenclature will be adopted herein.

The 17β-ether thus prepared is next dihalogenated in the ethynyl group. One convenient procedure by which halogenation is effected is direct halogenation with a molecular halogenating agent such as chlorine or bromine. In accordance with this procedure a solution of the steroid in a reaction inert organic solvent, preferably a lower halogenated hydrocarbon solvent such as chloroform or methylene dichloride is mixed, preferably by slow addition, with a solution of the halogen preferably in the same solvent. The reaction is a low temperature reaction and it is preferred to maintain the temperature between about −10° C. and about 10° C. during the formation of the 20,21-dihalo steroid.

The product may be isolated by any convenient procedure. In one suitable method, the reaction mixture is first washed with aqueous base such as saturated sodium bicarbonate solution and then with water. The organic layer is separated, dried over an anhydrous drying agent such as anhydrous sodium sulfate, filtered and the solvent removed to leave the desired product as a residue.

The 20,21-dihalo compound can also be prepared by treating the steroid with an N-haloacylimide such as N-chlorosuccinimide or N-bromosuccinimide in the presence of an alkali metal halide, preferably lithium, sodium or potassium chloride or bromide. The temperature of the reaction is not critical. For convenience, it is preferred to mix the ingredients in a reaction inert solvent of the class described above in connection with the reaction with molecular halogen at ambient temperature, i.e. 20° C. to 35° C. Reaction is generally complete in from about 10 minutes to about 4 hours. For economy, it is preferred to use a slight excess, i.e. up to 10% molar excess of the halogenating agent to insure as complete a reaction as possible of the steroid. This is not essential, however. The product may be recovered in the same manner as is described in the previous paragraph.

Best yields are obtained in this procedure by utilizing mixtures of the N-haloacylimide and alkali metal which are prepared and recovered together. For example, a mixture of N-bromosuccinimide and potassium bromide may be obtained by coprecipitation from a lower alkanol solvent. The precipitate is formed by adding molecular bromine to an equimolar mixture of succinimide and potassium hydroxide in an alkanol such as methanol.

The 20,21-dihalo steroid is next dehydrohalogenated with strong base in a reaction inert solvent. The blocking group at the 17-position is subsequently removed to give the desired compound. The reaction is carried out by treating the steroid at an elevated temperature, e.g. about 75° C. to about 120° C. in a reaction inert organic solvent suitably a lower halogenated hydrocarbon solvent with a solution of an alkali metal lower alkoxide such as potassium t-butoxide preferably in the same solvent. It is most convenient to simply take up the reactants in a solvent which boils within the above-stated range and to reflux for from about 3 to 5 hours. The reaction mixture is then made acid, for example by the addition of aqueous mineral acid, such as dilute aqueous hydrochloric acid at from about 20° C. to about 35° C. for from about 8 to about 16 hours.

The product which forms may be recovered as described above for the dihalo compound.

The hydrogen atom of the ethynyl group may also be replaced with halogen by first reacting the ethynyl compound with a heavy metal lower alkanoate such as mercuric acetate to give the corresponding disteroid metal salt which, on treatment with molecular halogen gives the desired product. The procedure may be illustrated as follows:

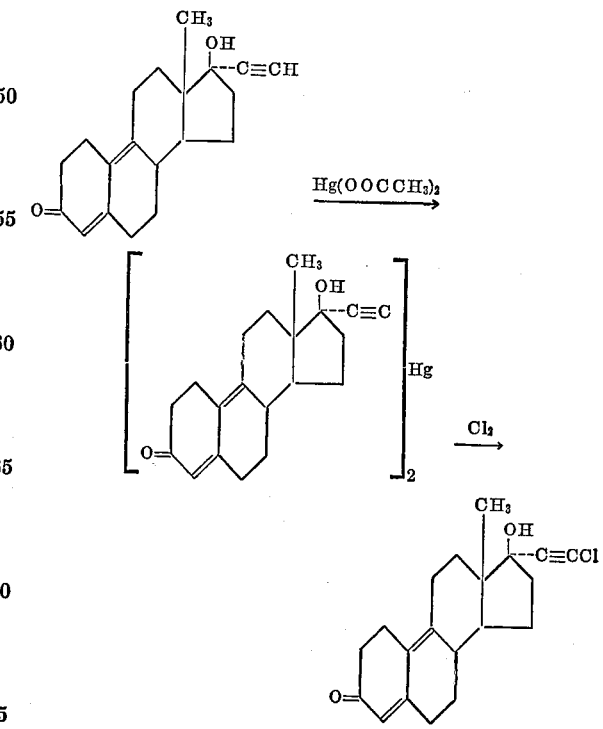

The heavy metal salt, for example the mercury or silver salt is formed by reaction between the steroid and the selected heavy metal alkanoate in a basic organic solvent, for example a lower alkyl amine preferably butyl amine. It is convenient to add a solution of the steroid in the selected solvent to a solution of the salt in the same solvent at a temperature of from about 20° C. to about 35° C. There is an initial evolution of heat and when this has ceased the desired product may be isolated.

A convenient isolation procedure is to add the reaction mixture to a cold dilute aqueous mineral acid such as 0.3 N to 1.0 N sulfuric acid. It is recovered from the aqueous mixture by extraction with a water immiscible organic solvent such as ethyl acetate followed by removal of the solvent.

The steroid metal salt is converted to the desired 17α-haloethynyl steroid by reaction with molecular halogen. This conversion is effected by adding a solution of the selected molecular halogen in a reaction inert organic solvent to a solution of the heavy metal steroid salt in preferably the same solvent. Reaction is completed by agitating for from about 10 minutes to about 1 hour after the addition is complete. Suitable solvents include aromatic hydrocarbon solvents such as benzene, toluene and xylene. Of these benzene is preferred.

The product may be recovered by evaporation of the solvent in vacuo and purified chromatographically. For example, the residue is taken up in a petroleum ether containing up to 10% by weight of benzene and washed through a charcoal column containing one part in ten of 10% palladium on charcoal. The purified product is recovered by removal of the solvent.

A number of novel and useful intermediates are prepared in accordance with the processes of this invention. These include 3-ketal, 3-enol ether and 3-pyrrolidine derivatives of 17α-ethynyl and 17α-haloethynyl-17β-tetrahydropyranyloxy-estra-5(10),9(11) - dien - 3 - one which may be represented by the formulas:

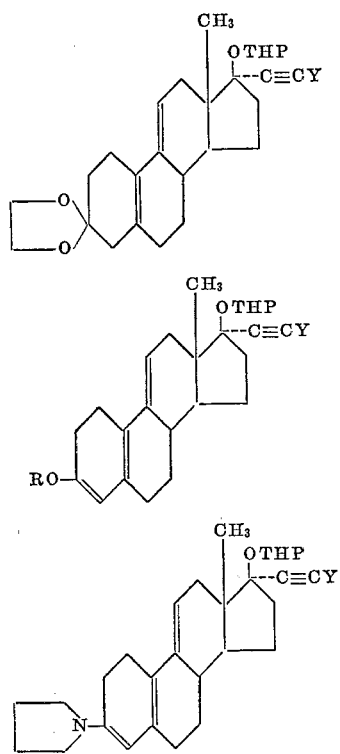

wherein THP is tetrahydropyranyl, R is lower alkyl and Y is hydrogen, chlorine or bromine.

Other new compounds are 17β-tetrahydropyranyloxy derivatives of 20,21 - dihalo - pregna-4,9,20-trien-3-one which may be represented by the formula:

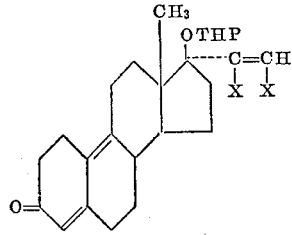

wherein THP and X have the same meaning as above.

The heavy metal steroids prepared in accordance with this invention are also new. They are heavy metal salts of 17α-ethynyl-17β-hydroxy-estra - 4,9 - dien-3-ones and may be represented by the formula:

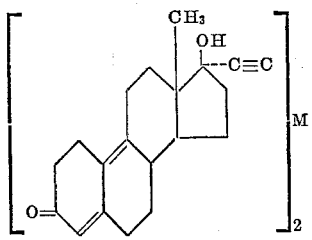

wherein M is a heavy metal such as mercury or silver.

EXAMPLE 1

To a solution of one g. 17α-ethynyl-17β-hydroxy-4,9-estradiene-3-one dissolved in 75 ml. of benzene is added 7.5 ml. of ethylene glycol, together with 50 mg. of p-toluene sulfonic acid. The reaction mixture is heated at reflux with a water separator for 20 hours. The reaction mixture is cooled and bicarbonate solution is added, the reaction mixture is extracted with ether. The combined extracts are washed with water, dried over sodium sulfate and evaporated to dryness to give 3-ethylenedioxy-17α-ethynyl-17β-hydroxy-5(10),9(11)-estradiene.

EXAMPLE 2

3 ml. pyrrolidine is added to a solution of 2.7 g. of 17α - ethynyl - 17β - hydroxy - 4,9-estradiene-3-one in 30 ml. of methanol. The solution is heated under reflux under nitrogen for one hour. The solution is reduced in volume in vacuo, taking care to exclude moisture. The product crystallizes on cooling and is recrystallized to give substantially pure 3 - (N - pyrrolidyl) - 17α - ethynyl-17β-hydroxy-3,5(10),9(11)-estratriene.

EXAMPLE 3

A mixture of 1 g. of 17α-ethynyl - 17β - hydroxy-4,9-estradiene-3-one, 100 mg. of p-toluene sulfonic acid monohydrate and 20 ml. of 2-ethyl-2-methyl-1,3-dioxolane are heated, and the liberated butanone, admixed with the reactant dioxolane distilled slowly through a small Claisen-Vigreux column at atmospheric pressure for 5 hours. The cooled reaction mixture is diluted with benzene, washed successively with 5% aqueous sodium bicarbonate and with water, dried over sodium sulfate and concentrated to dryness. Crystallization gives 3-ethylene-dioxy-17α-ethynyl-17β-hydroxy-5(10),9(11)-estradiene.

EXAMPLE 4

To a solution of 100 mg. of 17α-ethynyl-17β-hydroxy-4,9 - estradiene - 3 - one in 3 ml. of dioxane is added 2 ml. of ethyl orthoformate and 10 mg. of 2,4-dinitrobenzene sulfonic acid. The reaction mixture is stirred at room temperature for 3 hours and 1 ml. of pyridine is added, followed by the dropwise addition of 5 ml. of water. The aqueous phase is separated and extracted with benzene. The organic extracts are washed with sodium bicarbonate solution and then with water until the washings are neutral. The organic phase is dried over sodium sulfate and concentrated in vacuo to give 3-ethoxy-17α-ethynyl-17β-hydroxy-3,5(10),9(11)-estratriene.

EXAMPLE 5

1 g. of 3 - ethylenedioxy - 17α - ethynyl-17β-hydroxy-5 (10),9(11)-estradiene is dissolved in 5 ml. of freshly distilled 2,3-dihydropyran, 0.1 g. of p-toluene sulfonyl chloride is added and the mixture stood for 14 hours at room temperature. 100 ml. of ether are added and the mixture washed sequentially with aqueous normal sodium hydroxide solution and water, the ether layer is dried over magnesium sulfate, filtered and the filtrate evaporated to give substantially pure 3-ethylenedioxy- 17α - ethynyl-17β-hydroxy - 5(10),9(11)-estradiene - 17β - tetrahydropyranyl ether.

In accordance with the above procedure but starting with 3 - (N-pyrrolidyl) - 17α - ethynyl-17β-hydroxy-3,5 (10),9(11)- estratriene and 3-ethoxy-17α-ethynyl-17β-hydroxy-3,5(10),9(11)-estratriene in place of 3-ethylenedioxy - 17α - ethynyl - 17β - hydroxy-5(10),9(11)-estradiene there is obtained 3-(N-pyrrolidyl) - 17α-ethynyl-17β-hydroxy - 3,5(10),9(11)-estratriene - 17β - tetrahydropyranyl ether and 3-ethoxy-17α-ethynyl-17β-hydroxy-3,5 (10),9(11)-estratriene.

EXAMPLE 6

30 ml. of liquid ammonia is charged into a 3 neck flask which has been cooled in Dry Ice and fed with a stirrer, an inlet tube and an outlet tube. 78 mg. of metallic potassium in small pieces are added. A trace of crystalline ferric chloride is added and the mixture stirred until the blue color is discharged. 788 mg. of 3-ethoxy-17α-ethynyl - 3,5(10),9(11)-estratriene - 17β-tetrahydropyranyl ether in 10 ml. of tetrahydrofuran are added. The mixture is stirred for 3 hours and the ammonia allowed to evaporate overnight under a slow stream of nitrogen, extreme care being taken to exclude all moisture and oxygen. 50 ml. of dry tetrahydrofuran are then added and the mixture stirred to give a suspension of 3-ethoxy-17α-ethyny-3,5(10),9(11)-estratriene-17β-tetrahydropyranyl ether potassium salt which is used without further purification.

In accordance with the above procedure but starting with lithium, sodium and calcium in place of potassium there is obtained the corresponding lithium, sodium or potassium salt.

In accordance with the above procedure but starting with 3-ethylenedioxy-17α-ethynyl-5(10),9(11)-estradiene-17β-tetrahydropyranyl ether, and 3 - (N-pyrrolidyl)-17α-ethynyl - 3,5(10),9(11) - estratriene - 17β - tetrahydropyranyl ether in place of 3-ethoxy-17α-ethynyl-17β-hydroxy-3,5(10),9(11)-estratriene tetrahydropyranyl ether there is obtained the corresponding 3-ethylenedioxy-7α-ethynyl-5 (10),9(11)-estradiene-17β-tetrahydropyranyl ether metal salt, 3(N-pyrrolidyl)-17α-ethynyl-3,5(10),9(11)-estratriene-17β - tetrahydropyranyl ether metal salt.

EXAMPLE 7

To a suspension of 3-ethoxy-17α - ethynyl-3,5(10),9 (11)-estratriene-17β - tetrahydropyranyl ether potassium salt in tetrahydrofuran is added a solution of N-chlorosuccinimide in carbon tetrachloride. The mixture is stirred at room temperature for about 18 hours. The entire reaction mixture is poured into water and extracted with ether. The ether extracts are washed with a saturated aqueous solution of sodium bicarbonate and then with water. The ether extract is dried over sodium sulfate, filtered and evaporated to dryness. The oily residue is filtered through aluminum oxide to give a further oil which is chromatographed on activated alkaline alumina. Elution yields 3-ethoxy - 17α-chloroethynyl-3,5(10),9(11)-estratriene - 17β-tetrahydropyranyl ether.

In accordance with the above procedure but using N-bromosuccinimide in place of N-chlorosuccinimide there is obtained 3-ethoxy - 17α-bromoethynyl-3,5(10),9(11)- estratriene-17β - tetrahydropyranyl ether. In accordance with the above procedure but starting with 3-ethylenedioxy-17α - ethynyl-5(10),9(11) - estradiene - 17β-tetrahydropyranyl ether metal salt and 3-(N-pyrrolidyl)-17α-ethynyl - 3,5(10),9(11) - estratriene - 17β - tetrahydropyranyl ether salt in place of 3-ethoxy-17α-ethynyl-3,5(10), 9(11)-estratriene-17β-tetrahydropyranyl ether metal salt there is obtained the corresponding 3-ethylenedioxy-17α-haloethynyl - 5(10),9(11) - estradiene - 17β - tetrahydropyranyl ether and 3-(N-pyrrolidyl) - 17α - haloethynyl-3,5(10),9(11)-estratriene-17β-tetrahydropyranyl ether.

EXAMPLE 8

A solution of 3-ethoxy - 17α-ethynyl - 3,5(10),9(11)-estratriene-17β - tetrahydropyranyl ether (0.2 mole) is added with vigorous stirring to suspension of (0.2 mole) of sodamide in benzene and a solution of 41.9 g. (0.22 mole) of p-toluene sulfonyl chloride in 100 ml. of benzene then added slowly. After heating under reflux for one hour the reaction mixture was decomposed with dilute hydrochloric acid and the benzene layer separated, washed with saturated aqueous sodium bicarbonate and then with water. The benzene extract is dried over sodium sulfate, filtered and concentrated in vacuo to give an oily residue which is filtered through aluminum oxide to give a further oil which is chromatographed on activated alkaline alumina. Elution yields 3-ethoxy-17α - chloroethynyl-3,5 5(10),9(11) - estratriene - 17β - tetrahydropyranyl ether.

In accordance with the above procedure but starting with p-toluene sulfonyl bromide in place of p-toluene sulfonyl chloride there is obtained 3-ethoxy-17α-bromoethynyl-3, 5(10),9(11) - estratriene - 17β - tetrahydropyranyl ether.

In accordance with the above procedure but starting with 3 - ethylenedioxy - 17α - ethynyl - 5(10),9(11) - estradiene - 17β-tetrahydropyranyl ether, 3 - (N-pyrrolidyl)-17α - ethynyl - 3,5(10),9(11)-estratriene - 17β-tetrahydropyranyl ether in place of 3 - ethoxy-17α - ethynyl-3,5 (10),9(11) - estratriene - 17β - tetrahydropyranyl ether there is obtained the corresponding 3-ethylenedioxy-17α-haloethynyl - 5(10),9(11) - estradiene - 17β - tetrahydropyranyl ether and 3-(N-pyrrolidyl) - 17α - haloethynyl-3,5(10),9(11) - estratriene - 17β-tetrahydropyranyl ether.

EXAMPLE 9

To a solution of 400 mg. of 3-ethoxy-17α-chlorethynyl-3,5(10),9(11) - estratriene - 17β-tetrahydropyranyl ether in 40 ml. of methanol is added 0.8 ml. of concentrated hydrochloric acid and the reaction mixture stirred overnight at room temperature. The methanol is then removed under reduced pressure, water added and the resulting mixture extracted with ether. The combined ether extracts are washed with water and dried over sodium sulfate, filtered and evaporated to dryness to give 17α - chloroethynyl-17β-hydroxy-4,9-estradiene-3-one.

In accordance with the above procedure but starting with 3-ethoxy - 17α-bromoethynyl - 3,5(10),9(11) - estratriene - 17β - tetrahydropyranyl ether, 3-ethylenedioxy-17α - chloroethynyl - 5(10),9(11)-estradiene-17β-tetrahydropyranyl ether, 3-ethylenedioxy - 17α - bromoethynyl - 5(10),9(11) - estradiene - 17β-tetrahydropyranyl ether, 3 - (N-pyrrolidyl) - 17α-chloroethynyl-3,5(10),9 (11)-estratriene - 17β-tetrahydropyranyl ether, and 3-(N-pyrrolidyl)-17α - bromoethynyl - 3,5(10),9(11)-estratriene-17β - tetrahydropyranyl ether in place of 3-ethoxy-17α - chloroethynyl - 3,5(10),9(11) - estratriene-17β-tetrahydropyranyl ether there is obtained the corresponding 17α-haloethynyl-17β-hydroxy-4,9-estradiene-3-one.

EXAMPLE 10

To a solution of 17α-ethynyl-4,9 - estradiene-3-one-17β-tetrahydropyranyl ether in chloroform which is cooled to 0° C. is added dropwise with stirring a solution of chlorine in chloroform. The solution is washed with saturated aqueous sodium bicarbonate solution and water, dried over sodium sulfate and evaporated to dryness to give 20, 21-dichloro-4,9,20-19-nor-pregnatriene-3-one-17β-tetrahydropyranyl ether which may be used without further purification.

In accordance with the above procedure but using bromine in place of chlorine there is obtained 20,21-dibromo-4,9,20-19-nor-pregnatriene-3-one tetrahydropyranyl ether.

EXAMPLE 11

400 mg. of 17α-ethynyl-4,9-estradiene-3-one-17β-tetrahydropyranyl ether are dissolved in 10 ml. of carbon tetrachloride and a mixture of 205 mg. of 61% N-bromosuccinimide (containing 125 mg. of N-bromosuccinimide and 80 mg. of potassium bromide) are heated under reflux for 14 hours. The mixture is cooled and filtered, the filtrate washed with a saturated aqueous solution of sodium bicarbonate and then with water. The carbon tetrachloride solution is then dried over sodium sulfate, filtered and evaporated to give substantially pure 20,21-dibromo-4,9,20-19-nor-pregnatriene-3-one-17β-tetrahydropyranyl ether.

In accordance with the above procedure but using sodium or lithium bromide in place of potassium bromide the same product is obtained.

Similarly, using an alkali metal chloride in the presence of N-chlorosuccinimide in place of an alkali metal bromide in the presence of N-bromosuccinimide there is obtained 20,21-dichloro-4,9,20-19-nor-pregnatriene-3-one-17β-tetrahydropyranyl ether.

The N-halosuccinimide/alkali metal halide mixtures as used above may be prepared in the following manner: To a mixture of 200 ml. of methanol and 400 ml. of water is added 65 g. of potassium hydroxide. The solution is cooled to 0° and 99 g. (1 mole) of succinimide is added with vigorous stirring. After any insoluble material is removed by filtration, 160 g. (1 mole) of bromine is added rapidly with stirring. The precipitated N-bromosuccinimide-potassium bromide mixture is removed by filtration, washed with three 100 ml. portions of methanol, and dried over phosphorus pentoxide under a vacuum. The yield is 150 g. The N-bromosuccinimide content is determined iodometrically and the potassium bromide content is determined by washing with perchloric acid.

EXAMPLE 12

Potassium is dissolved in t-butanol. The t-butanol is distilled off under nitrogen and reduced pressure and replaced by dry benzene to which is added a solution of 20,21-dichloro-4,9,20-19-nor-pregnatriene-3-one-17β-tetrahydropyranyl ether in benzene. The mixture is heated under reflux for 4 hours and on cooling is made acid with aqueous hydrochloric acid (4 N) and stirred overnight. The benzene layer is washed with saturated aqueous sodium bicarbonate and water, dried over sodium sulfate and evaporated to dryness in vacuo to give 17α-chloroethynyl-17β-hydroxy-4,9-estradiene-3-one.

In accordance with the above procedure but starting with 20,21-dibromo-4,9,20-19-nor-pregnatriene-3-one-17β-tetrahydropyranyl ether in place of 20,21-dichloro-4,9,20-19-nor-pregnatriene-3-one-17β-tetrahydropyranyl ether there is obtained 17α-bromoethynyl-17β-hydroxy-4,9-estradiene-3-one.

EXAMPLE 13

A solution of 17α-ethynyl-17β-hydroxy-4,9-estradiene-3-one in 10 ml. of n-butylamine is added to a solution of mercuric acetate in 15 ml. of the same solvent. After 2 minutes, when the evolution of heat has ceased, the mixture is poured into 50 ml. of ice cold .5 N sulfuric acid and the neutral fraction extracted with ethyl acetate. The ethyl acetate extract is dried over sodium sulfate and evaporated to dryness. The residue is recrystallized from benzene to give di(17α-ethynyl-17β-hydroxy-4,9-estradiene-3-one) mercury.

EXAMPLE 14

To a stirred solution of di(17α-ethynyl-17β-hydroxy-4,9-estradiene-3-one) mercury in 150 ml. of benzene is added dropwise a solution of 1.81 g. of bromine in 20 ml. of benzene. A red color persists after 80% of the bromine has been added. When addition is complete the mixture is stirred for a further 10 minutes and the solvent removed under vacuum under 60°. The residue is extracted several times with chilled light petroleum/benzene and the extract freed from mercuric bromide by passage through a short column of charcoal containing 1 part in 10 of 10% palladium charcoal. Evaporation of the eluate followed by recrystallization from ethyl acetate gives 17α-bromoethynyl-17β-hydroxy-4,9-estradiene-3-one.

In accordance with the above procedure but using chlorine in carbon tetrachloride in place of bromine in benzene there is obtained 17α-chloroethynyl-17β-hydroxy-4,9-estradiene-3-one.

In accordance with the above procedure but starting with the corresponding silver acetylide in place of the mercury acetylide the same product is obtained.

We claim:
1. A process which comprises forming an enol ether of a 17α-ethynyl-17β-hydroxy-estra-4,9-dien-3-one, reacting said ether with dihydropyran, reacting resulting 17-tetrahydropyranyl ether with an alkali metal in liquid ammonia in the presence of a ferric salt, reacting resulting alkali metal salt with an N-haloacylimide and hydrolyzing resulting 17α-haloethynyl compound to regenerate the 3-oxo and 17β-hydroxyl groups.

2. A process which comprises reacting a 17α-ethynyl-17β-hydroxy-estra-4,9-dien-3-one with ethyl orthoformate, reacting resulting 3-ethoxy-enol ether with dihydropyran, reacting resulting 17-tetrahydropyranyl ether with sodium in liquid ammonia in the presence of a ferric salt, reacting resulting sodium salt with N-chlorosuccinimide and hydrolyzing resulting 17α-chloroethynyl compound to regenerate the 3-oxo and 17β-hydroxyl groups.

3. A process which comprises reacting a 17α-ethynyl-17β-hydroxy-estra-4,9-dien-3-one with pyrrolidine, reacting resulting 3-(N-pyrrolidinyl) compound with dihydropyran, reacting resulting 17-tetrahydropyranyl ether with an alkali metal in liquid ammonia in the presence of a ferric salt, reacting resulting alkali metal salt with an N-haloacylimide and hydrolyzing resulting 17α-haloethynyl compound to regenerate the 3-oxo and 17β-hydroxyl groups.

4. A process which comprises forming a 3-alkylenedioxy derivative of 17α-ethynyl-17β-hydroxy-estra-4,9-dien-3-one, reacting said derivative with dihydropyran, reacting resulting 17-tetrahydropyranyl ether with an alkali metal amide and a sulfonyl halide, and hydrolyzing resulting 17α-haloethynyl compound to regenerate the 3-oxo and 17β-hydroxyl groups.

5. A process which comprises forming an enol ether of a 17α-ethynyl-17β-hydroxy-estra-4,9-dien-3-one, reacting said ether with dihydropyran, reacting resulting 17-tetrahydropyranyl ether with an alkali metal amide and a sulfonyl halide, and hydrolyzing resulting 17α-haloethynyl compound to regenerate the 3-oxo and 17β-hydroxyl groups.

6. A process which comprises reacting a 17α-ethynyl-17β-hydroxy-estra-4,9-dien-3-one with pyrrolidine, reacting resulting 3-(N-pyrrolidinyl)-compound with dihydropyran, reacting resulting 17-tetrahydropyranyl ether with sodamide and p-toluene sulfonyl chloride and hydrolyzing resulting 17α-chloroethynyl compound to regenerate the 3-oxo and 17β-hydroxyl groups.

7. A process which comprises reacting a 17α-ethynyl-17β-hydroxy-estra-4,9-dien-3-one with a heavy metal lower alkanoate and reacting resulting compound with molecular chlorine.

8. A process which comprises reacting a 17α-ethynyl-17β-hydroxy-estra-4,9-dien-3-one with a mercuric acetate and reacting resulting compound with molecular chlorine.

9. 3-ketal, 3-enol ether and 3-pyrrolidine derivatives of 17α-ethynyl and 17α-haloethynyl-17β-tetrahydropyranyloxy-estra-5(10),9(11)-dien-3-ones.

10. 3 - ethylenedioxy - 17β - tetrahydropyranyloxy-17α-ethynyl-estra-5(10),9(11)-diene.

11. 3 - ethylenedioxy - 17β - tetrahydropyranyloxy-17α-bromoethynyl-estra-5(10),9(11)-diene.

12. 3 - ethylenedioxy - 17β - tetrahydropyranyloxy-17α-chloroethynyl-estra-5(10),9(11)-diene.

13. 3 - ethoxy - 17β - tetrahydropyranyloxy-17α-haloethynyl-estra-3,5(10),9(11)-triene.

14. 3-ethoxy - 17β - tetrahydropyranyloxy-17α-chloroethynyl-estra-3,5(10),9(11)-triene.

15. 3-(N - pyrrolidinyl) - 17β - tetrahydropyranyloxy-17α-haloethynyl-estra-3,5(10),9(11)-triene.

16. 3-(N - pyrrolidinyl) - 17β - tetrahydropyranyloxy-17α-chloroethynyl-estra-3,5(10),9(11)-triene.

References Cited
UNITED STATES PATENTS 3,067,214  12/1962  Oberster et al. _____ 260—397.4

ELBERT L. ROBERTS, *Primary Examiner.*

U.S. Cl. X.R.

260—239.5, 397.4, 397.5